Apr. 17, 1923.
A. MARGELIS
FURNITURE CLAMP
Filed Aug. 14, 1922
1,452,164
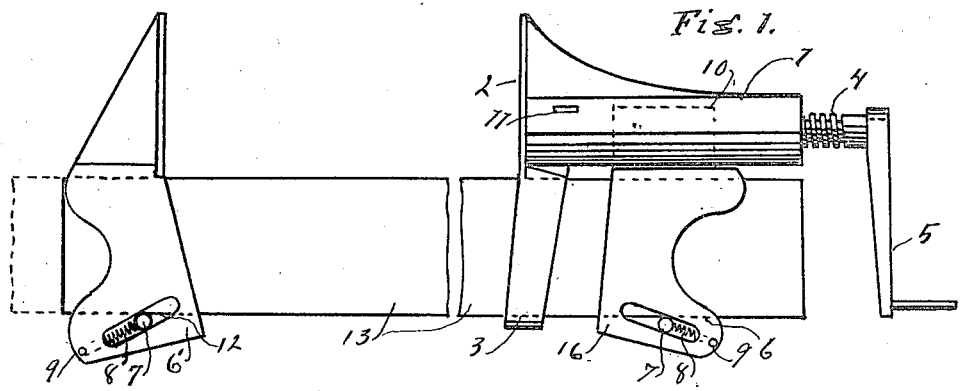
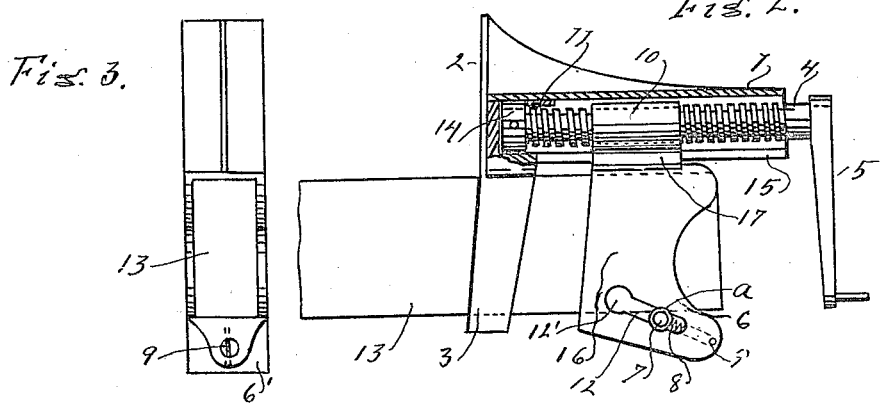
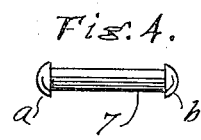
Inventor
Anthony Margelis
By Ethiel J. Cilley
Attorney Patented Apr. 17, 1923.

1,452,164

UNITED STATES PATENT OFFICE.

ANTHONY MARGELIS, OF GRAND RAPIDS, MICHIGAN.

FURNITURE CLAMP.

Application filed August 14, 1922. Serial No. 581,675.

*To all whom it may concern:*

Be it known that I, ANTHONY MARGELIS, a citizen of the United States, residing at Grand Rapids, in the county of Kent and State of Michigan, have invented certain new and useful Improvements in Furniture Clamps, of which the following is a specification.

My invention relates to improvements in furniture clamps, and its objects are: first, to provide a means whereby the clamping heads may be readily and easily moved longitudinally of the supporting bar; second, to provide a means whereby the anchored clamping head and the adjustable clamping head may both be firmly anchored upon the supporting bar, and, at the same time, readily adjusted longitudinally thereof; third, to provide a means whereby both clamping heads may be readily removed for storing and shipping; fourth, to provide a means whereby I am enabled to avert the necessity of making notches in the edge of the supporting bar for holding the clamping heads securely anchored in place, and, fifth, to provide a means whereby the anchoring element in the clamp will automatically move into position to securely anchor the clamping heads upon the supporting bar.

I attain these objects by the mechanism illustrated in the accompanying drawing, in which Fig. 1 is a side elevation of the clamp with the supporting bar cut in two. Fig. 2 is a side elevation of the adjustable clamping head, partly in section to show the means of applying the actuating screw thereto. Fig. 3 is a back elevation of the back clamping head, and, Fig. 4 is a plan of the anchoring element removed from the clamp.

Similar reference characters indicate similar parts throughout the several views.

In the accompanying drawing 13 represents an ordinary clamping bar of maple, or other suitable timber. 2 is the adjustable clamping head, and 2' is the anchored clamping head. This head having a yoke 6' thereon that exactly fits upon the bar 13 and is provided with an inclined slot 12, at each side of the bar, in which a roller 7 is placed in such a manner that the tensile force of the spring 8, anchored at one end against the pin 9, or its equivalent, will hold the roller against the surface of the bar so the body cannot be made to slide upon the bar, no matter how much force is brought to bear upon the clamping face of the clamping head.

The adjustable clamping head 2 has a yoke 3 thereon that is made to exactly fit over the bar 13 and act as a sliding support to this head when being manipulated to clamp an object between the two heads, or to release such object. This head, also has a long cylindrical body 1 upon it for the reception of the screw 4 and the nut 10, on the anchor head 16. The slot 15 in the cylindrical body 1, of the adjustable head, is for the free passage of the neck 17 of the anchor head 16 so that the body 1 may pass easily over the nut 10 when manipulating the head with the screw 4. This screw is mounted in the nut 10 in such a manner that when it is made to revolve by means of the crank 5 it will be made to move longitudinally of the bar 13. I prefer that the inner end of this screw be provided with a broad annular band 14 to press against the wall of the head to force it against the object to be clamped, and I find it very advisable to have a key 11 passed through the body 1 back of the band 14 so that when the screw is turned backwardly it will positively insure the withdrawal of the head from the object in the clamp.

I prefer that the anchoring roller 7 be provided with a head, *a*, or *b*, at each end to prevent it from accidentally dropping out of its bearings 12, and find it convenient to make one of these heads, as *a*, removable so the roller may be readily entered and removed, though this is not actually necessary as the removal of the roller may be provided for by making the upper or inner end of the slot 12 larger, as indicated at 12' in Fig. 2, whereby the roller may be readily inserted when the yoke is off of the bar, but cannot be removed, or drop out when the yoke is on the bar.

Having thus fully described my invention, what I claim as new in the art, is:

1. In combination with a furniture clamp, a supporting bar, a movable clamping head, a yoke integral therewith and made to enfold the supporting bar, a long cylindrical body integral with said head and having a slot through one side, an anchoring body fitted upon the supporting rail and having laterally disposed slots through it at an incline from the horizontal a roller and an actuating spring connected with the body in said slots, a nut made integral with the anchoring body and positioned inside of the cylindrical body of the clamping head, an actuating screw passing through the cylindrical body and the nut for moving the clamping head longitudinally of the supporting bar, and means for preventing the screw from moving longitudinally in the body when screwing it through the nut.

2. In combination with the elements covered in claim 1, a sleeve secured to the end of the screw and a key passed through the body back of said sleeve to prevent longitudinal movement of the screw independently of the body.

3. In combination with the elements covered in claim 1, heads placed upon the ends of the roller, and means provided whereby the roller may be readily inserted into the slots, but cannot be removed when the clamp is assembled.

Signed at Grand Rapids, Michigan, August 11, 1922.

ANTHONY MARGELIS.